United States Patent [19]
Morse

[11] 3,768,519
[45] Oct. 30, 1973

[54] MODULATOR FOR ADAPTIVE BRAKING SYSTEM

[75] Inventor: Robert J. Morse, Elyria, Ohio
[73] Assignee: The Bendix Corporation, South Bend, Ind.
[22] Filed: Nov. 16, 1971
[21] Appl. No.: 199,108

[52] U.S. Cl............................. 137/627.5, 303/21 F
[51] Int. Cl............................................... B60t 8/10
[58] Field of Search ................. 303/21 F; 137/627.5

[56] References Cited
UNITED STATES PATENTS
| | | | |
|---|---|---|---|
| 3,286,734 | 11/1966 | Hartshorne..................... | 303/21 F X |
| 3,525,555 | 8/1970 | Meyer et al................. | 137/627.5 X |
| 3,620,577 | 11/1971 | Neisch et al................ | 303/21 F UX |

*Primary Examiner*—Robert G. Nilson
*Attorney*—Ken C. Decker

[57] ABSTRACT

An adaptive braking control valve is mounted in the primary chamber of a standard relay valve used to control brake actuation in a vehicle equipped with air-actuated brakes. The adaptive braking control valve responds to an output signal from a logic controller to permit the air pressure in the primary chamber of the relay valve to decay when an incipient skidding condition is sensed at the control wheel, and subsequently permits the pressure level in the primary chamber to increase at a controlled rate. The relay valve responds to pressure changes in the primary chamber to control communication of air pressure to the vehicle's brakes in the normal manner. Therefore, the relay valve equipped with the adaptive braking control valve functions as an adaptive braking modulator to prevent a skidding condition in the control wheel.

9 Claims, 2 Drawing Figures

PATENTED OCT 30 1973 3,768,519

INVENTOR.
ROBERT J. MORSE
BY
*Ken C. Decker*
ATTORNEY 3,768,519

MODULATOR FOR ADAPTIVE BRAKING SYSTEM

BACKGROUND OF THE INVENTION

This invention relates to a brake control device for use in an adaptive braking system for an air brake vehicle.

Although a number of adaptive braking modulators are known to the prior art, most of these devices are rather complicated mechanisms which must be provided in addition to the other components of a vehicle braking system. Since in an air brake vehicle, all of the brakes on a single axle are controlled by a relay valve which responds to a pressure signal from the operator-operated brake control valve, a substantial cost savings may be realized by providing appropriate adaptive braking valving within the relay valve so that the relay valve may function as an adaptive braking modulator.

SUMMARY OF THE INVENTION

Therefore, an important object of my invention is to provide adaptive braking valving for use with a standard relay valve currently used in air braking systems so that the relay valve may also function as an adaptive braking modulator.

Another important object of my invention is to substantially reduce the cost of an adaptive braking system by reducing the number of separate components currently required in an adaptive braking system.

A further important object of my invention is to provide an adaptive braking modulator having a multiplicity of decay rates and build rates, but which may also be manufactured at a minimum cost.

DETAILED DESCRIPTION

Figure 1:
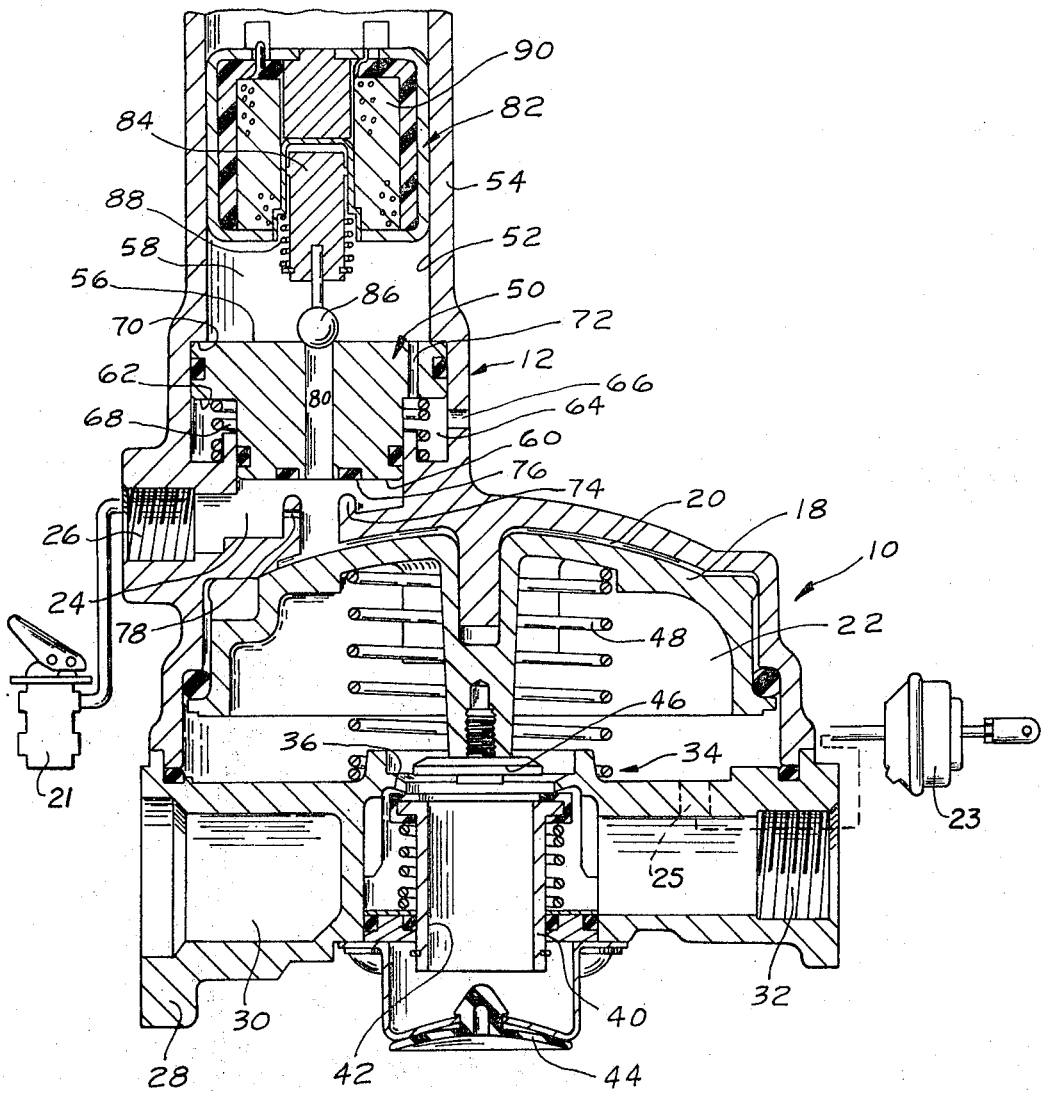
FIG. 1 is a longitudinal cross-sectional view of a relay valve which incorporates adaptive braking valving made pursuant to the teachings of my present invention.

Referring now to the drawing, a standard air brake relay valve generally indicated by the numeral 10 includes adaptive braking valve means generally indicated by the numeral 12 mounted in the cover thereof. The relay valve 10 includes a housing 14 defining a bore 16 therewithin which slidably receives a control piston 18. The piston 18 defines a primary chamber 20 between one face of the piston 18 and a corresponding end of the bore, and a delivery chamber 22 between the other face of the piston 18 and the other end of the bore. The primary chamber 20 is communicated to a conventional operator-operated brake control valve 21 through first passage means 24 and an outlet port 26. Of course, the delivery chamber 22 is communicated to one or more of the vehicle's brake chambers 23 through appropriate outlet ports 25.

The housing 14 is provided with a mounting flange 28 which secures the housing 14 to a conventional high pressure air reservoir (not shown). The high pressure reservoir communicates pressurized air into supply chamber 30 defined within the relay valve 10. An inlet port 32 communicates the supply chamber 30, and therefore, the high pressure reservoir, to the air compressor operated by the vehicle's engine in such a way that as long as the engine is running, the air reservoir will be charged with pressurized air.

Valve means, generally indicated by the numeral 34, within the relay valve 10 include the circumferentially extending valve seating member 36 which defines an opening extending therethrough communicating the supply chamber 30 with the delivery chamber 22. A spring 38 yieldably urges a first valve member 40 into sealing engagement with the valve seat 36 so that communication between the chambers 22 and 30 is normally prevented. The valve member 40 defines a passage 42 therewithin which normally communicates the chamber 22 to the exterior of the relay valve 10 through an exhaust port 44. A second valve member 46 is secured to the piston 18 for movement therewith, and is adapted to sealingly engage the first valve member 40 to prevent fluid communication between the chamber 22 and the exhaust port 44, and thereafter to urge the valve member 40 away from the valve seat 36 to permit communication of high pressure air into the chamber 22 from the chamber 30. A spring 48 yieldably urges the piston 18, and therefore the valve member 46, away from the valve member 40. Since the piston 18 presents substantially equal faces exposed to the fluid pressure level in the primary chamber 20 and in the delivery chamber 22, the piston 18 responds to the pressure differential thereacross to increase or decrease the pressure level in the chamber 22, and therefore in the vehicle's brake actuators, in response to an increase or decrease in the pressure level in the primary chamber 20.

The adaptive braking valving 12 includes a piston 50 slidably mounted within a bore 52 defined within the housing 54. The piston 50 has a larger face 56 which cooperates with one end of the bore 52 to define a control chamber 58 therebetween and a smaller face 60 which defines a portion of the wall of the first passage means 24. A shoulder 62, which is located between the larger and smaller face of the piston 52, cooperates with the housing 54 to define another chamber 64 therebetween which is vented to the exterior of the housing by an opening 66. A spring 68 within the chamber 66 yieldably urges the piston 50 into engagement with a shoulder 70 on the housing 54 to thereby establish a predetermined initial volume of the control chamber 58. A bleed orifice 72 permits fluid communication at a controlled rate from the control chamber 58 to the chamber 64, and therefore to the exterior of the valve through the opening 66.

The adaptive braking valve means 12 further includes an annular valve seating member 74 circumscribing the first passage means 24 between the port 26 and the primary chamber 20. An annular sealing member 76 is carried on the smaller face 60 of the piston 50 and is adapted to sealingly engage the valve seating member 74 to prevent fluid communication therethrough as will hereinafter be described. However, a bleed orifice 78 extends through the valve seating member 74, and permits fluid to flow into the primary chamber 20 at a controlled rate even when the sealing member 76 is sealingly engaged with the valve seating member 74. However, the orifice 78 is sized such that fluid flows therethrough at a substantially lower rate than fluid flows from the control chamber 58 through the orifice 72. A passage 80 extends through the piston 50 and is adapted to communicate the control chamber 58 with the primary chamber 20. It will be noted that the passage 80 extends through the portion of the smaller face 60 that is circumscribed by the sealing member 76, so that fluid communication between the primary chamber 20 and the passage 80 is permitted even if the sealing member 76 is sealingly engaged with the valve seating member 74.

A solenoid valve generally indicated by the numeral 82 is mounted in the end of the control chamber 58 and includes an armature 84 which carries a sphere 86. A spring 88 yieldably urges the sphere 86 into sealing engagement with the passage 80, to normally prevent fluid communication therethrough unless the solenoid valve 82 is energized.

The solenoid valve 82 is actuated by a coil 90, energization of which is controlled by an output signal from the aforementioned electronic control unit (not shown). The electronic control unit may incorporate any appropriate logic which senses an incipient skidding condition in a vehicle wheel and produces a control signal for energizing the coil 90 in response thereto, such as the logic disclosed in copending U.S. Pat. application Ser. No. 81,481, filed Oct. 16, 1970, owned by the assignee of the present invention and incorporated herein by reference.

MODE OF OPERATION

The various components of the relay valve 10 are illustrated in FIG. 1 in the position which they assume when the brakes of the vehicle are released. In this position, the piston 50 is urged into engagement with the shoulder 70, and the sphere 86 sealingly engages the passage 80. The spring 38 urges the valve member 40 into sealing engagement with the valve seat 36, and the spring 48 urges the valve member 46 away from the valve member 40 so that fluid communication is permitted through the exhaust port 44 from the delivery chamber 22, and communication is prevented from the high pressure air chamber 30 into the delivery chamber 22. When a brake application which does not require an adaptive braking cycle is effected, high pressure air is admitted into the primary chamber 20 by the aforementioned brake control valve (not shown) through the inlet port 26 and first passage means 24. Since the chamber 22 is vented to atmosphere, a pressure differential exists across the piston 18, forcing the latter downwardly until the valve member 46 sealingly engages the valve member 40, thereby terminating fluid communication between the chamber 22 and the exhaust port 44, and thereafter urges the valve member 40 away from the valve seat 36 to permit fluid communication into the delivery chamber 22 from the high pressure air chamber 30, thereby establishing a brake actuating force in the aforementioned vehicle brake actuators (not shown). It will be noted, of course, that the pressure level communicated to the brake actuators is substantially the same as the pressure level communicated into the primary chamber 20. When the vehicle's brakes are subsequently released, air pressure in the primary chamber 20 is exhausted, thereby permitting the spring 48 to urge the valve member 46 away from the valve member 40, to again terminate fluid communication between the chambers 30 and 32 and to permit fluid communication between the chamber 22 and the exhaust port 40, to exhaust the vehicle's brake actuators.

Figure 2:
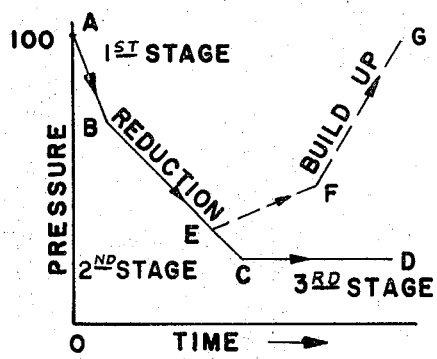
FIG. 2 is a graphical representation of the operation of the device illustrated in FIG. 1 during an adaptive braking cycle.

When an incipient skidding condition of one of the controlled vehicle wheels is sensed by the aforementioned electronic control unit, the coil 90 is energized to urge the sphere 86 away from the passage 80 to therefore permit fluid communication therethrough into the control chamber 58. Since the space 56 of piston 50 is substantially larger than the face 60, any increase in the pressure in the control chamber 58 urges the piston 50 downwardly until the sealing ring 76 sealingly engages the valve seating member 74, thereby terminating fluid communication into the primary chamber 20, except for the limited amount of fluid communicated through the orifice 78. Since the control chamber 58 is initially at substantially atmospheric pressure, the pressure level in the primary chamber 20 is substantially reduced, because the pressure in the chambers 58 and 20 immediately equalize since substantially uninhibited fluid communication therebetween is permitted through the passage 80. A fairly sharp pressure drop in the delivery chamber 22 is thereby effected and is represented graphically by line A-B in FIG. 2. After the fluid pressure levels in the chambers 20 and 58 equalize, fluid continues to exhaust from the control chamber 58 at a controlled rate through the bleed orifice 72. Since uninhibited fluid communication exists between the chambers 20 and 58, fluid also exhausts from the chamber 20 at a rate determined by the difference in area between the orifices 72 and 78. This operation is represented graphically by line B-C in FIG. 2, and continues until the solenoid valve 82 is deenergized, or until the pressure level in the control chamber 58 is exhausted to such a level that the force due to fluid pressure acting on the face 56 of piston 50 is equal to the sum of the forces exerted on the piston 50 by the spring 68 and by air pressure acting on the face 60 of the latter. When this occurs, the piston 50 moves a very small distance from the valve seating member 74, so that the total amount of fluid flowing into the primary chamber 20 through the orifice 78 and through the orifice defined between the sealing member 76 and the seating member 74 is substantially equal to the amount of fluid flowing from the control chamber 58 through the orifice 72. Thereafter, the fluid flowing into the primary chamber is equal to the fluid flowing out of the chamber, and the pressure level in the chamber 20 remains substantially constant, as represented by line C-D in FIG. 2.

When the controlled wheel reaccelerates to a predetermined level, the aforementioned electronic control unit deenergizes the solenoid valve 82, thereby permitting spring 84 to urge the sphere 86 back into sealing engagement with the passage 80 to terminate fluid communication between the control chamber 58 and the primary chamber 20. When this occurs, the pressure level in the primary chamber 20, and therefore, in the delivery chamber 22, increases at a predetermined rate, substantially equal to the fluid flow rate through the orifice 78, as represented by line E-F in FIG. 2. However, at the same time, fluid continues to exhaust from control chamber 58 at a controlled rate through the orifice 72, thereby decreasing the pressure level acting on the larger face 56 of piston 50. When the force of the fluid pressure acting on the face 56 of piston 50 is equalled by the sum of the forces exerted by the spring 68 and by the fluid pressure source acting on the face 60, the sealing member 76 moves away from the seating member 74 to permit fluid communication between the inlet port 26 and the primary chamber 20 at a substantially greater rate, as represented by lines F-G in FIG. 2. Of course, fluid pressure in the delivery chamber 22 increases at a corresponding rate. This cycling of the adaptive braking valve means 12 and relay valve 10 continues for an indefinite number of cycles until the vehicle is brought to a safe stop.

I claim:

1. In a relay valve having a primary chamber, a delivery chamber, first valve means responsive to the pressure differential between said primary and delivery chambers to maintain the pressure level in the delivery chamber substantially the same as the pressure level in the primary chamber, and first passage means communicating said primary chamber with a pressure control device;
   a housing defining a bore therewithin;
   normally open second valve means controlling fluid communication through said first passage means, said normally open second valve means including piston means slidably mounted in said bore for actuating said normally open second valve means;
   said piston means cooperating with the end of said bore to define a control chamber therebetween;
   second passage means communicating said control chamber with the fluid pressure level communicated to said primary chamber; and
   electrically operated valve means normally preventing fluid communication through said second passage means, but actuable to a position permitting fluid communication through the latter to vent the primary chamber to the control chamber to abruptly reduce the pressure level in the primary chamber and increase the pressure level in the control chamber, whereby the increased pressure level in the control chamber moves said piston means to close said normally open valve means, thereby restricting fluid communication into said primary chamber.

2. The invention of claim 1:
   said piston means being stepped to present larger and smaller faces with a shoulder therebetween;
   said larger face of said piston being exposed to the fluid pressure level in said control chamber, said smaller face of said piston being exposed to the fluid pressure level in said primary chamber.

3. The invention of claim 2; and
   stop means within said bore; and
   resilient means yieldably urging said piston means into engagement with said stop means to thereby establish a predetermined volume for said control chamber when fluid communication through said second passage means is prevented.

4. The invention of claim 2; and
   a first flow restricting orifice for permitting fluid to flow from said control chamber to decrease the pressure level in said control chamber at a controlled rate.

5. The invention of claim 4; and
   a second flow restricting orifice for permitting fluid to flow into said primary chamber at a limited rate when said normally open second valve means is closed, said second flow restricting orifice permitting flow of fluid therethrough at a lesser rate than does said first flow restricting orifice.

6. The invention of claim 2; and
   a flow restricting orifice for permitting fluid to flow into said primary chamber at a limited rate when said normally open second valve means is closed.

7. The invention of claim 2:
   said normally open second valve means including a first valve member in said first passage means and a second valve member carried on the smaller face of the piston.

8. The invention of claim 7:
   said first valve member dividing said first passage means into an inlet section communicating with said pressure control device and an outlet section communicating with said primary chamber;
   said second passage means extending through said piston to communicate said outlet section with said control chamber when the second valve member is sealingly engaged with the first valve member.

9. In a relay valve having a primary chamber, a delivery chamber, first valve means responsive to the pressure differential between said primary and delivery chambers to maintain the pressure level in the delivery chamber substantially the same as the pressure level in the primary chamber, and passage means communicating said primary chamber with a pressure control device;
   normally open second valve means controlling fluid communication through said passage means;
   electrically operated valve means responsive to the output of a logic controller to close said normally open second valve means to restrict fluid flow from said pressure control device into said primary chamber and simultaneously exhaust the fluid pressure from said primary chamber at a relatively rapid initial rate for a limited time period;
   a first flow restricting orifice permitting limited flow of fluid from said primary chamber at a lesser rate after said limited time period has expired while said electrically operated valve means is actuated; and
   a second flow restricting orifice permitting limited fluid flow from said pressure control device into said primary chamber when said normally open valve means is closed;
   the rate of fluid flow permitted through said first orifice being greater than the rate of fluid flow permitted through said second orifice.

* * * * *